INVENTORS
HAROLD OSTERBERG
ALVA H. BENNETT
BY
ATTORNEYS

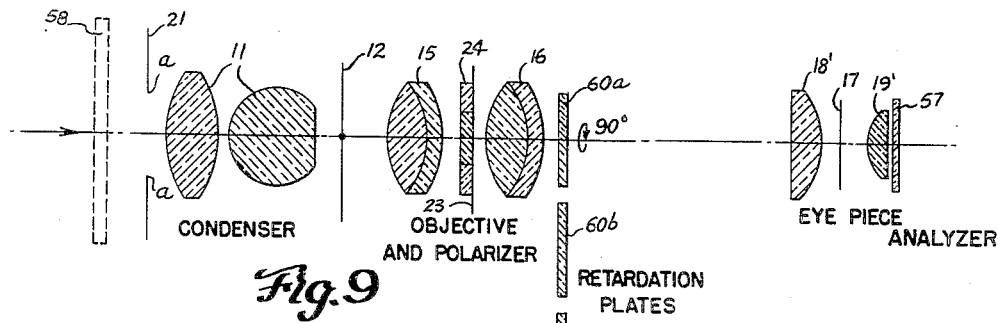
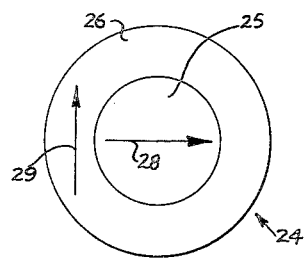
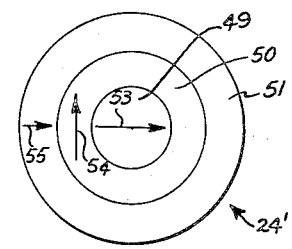
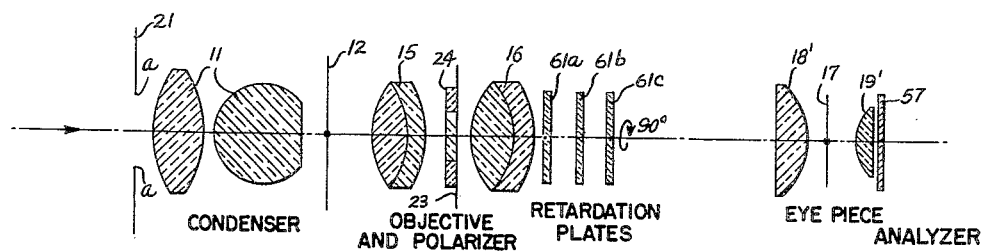
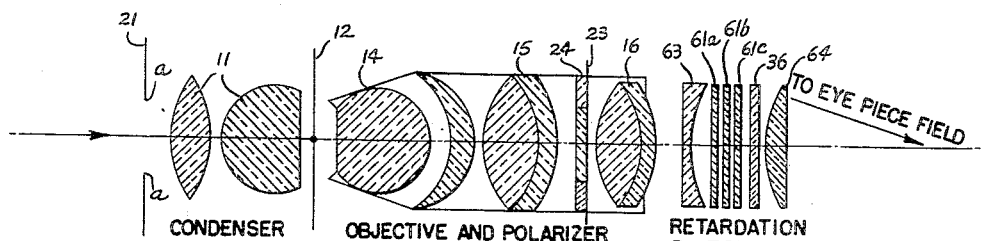

INVENTORS
HAROLD OSTERBERG
ALVA H. BENNETT
BY
ATTORNEYS

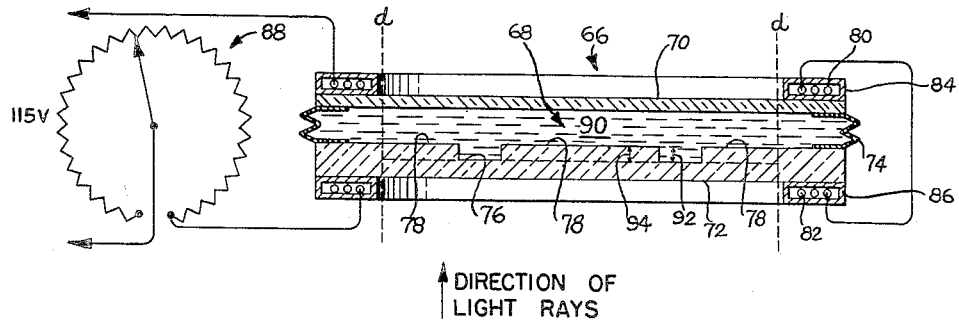
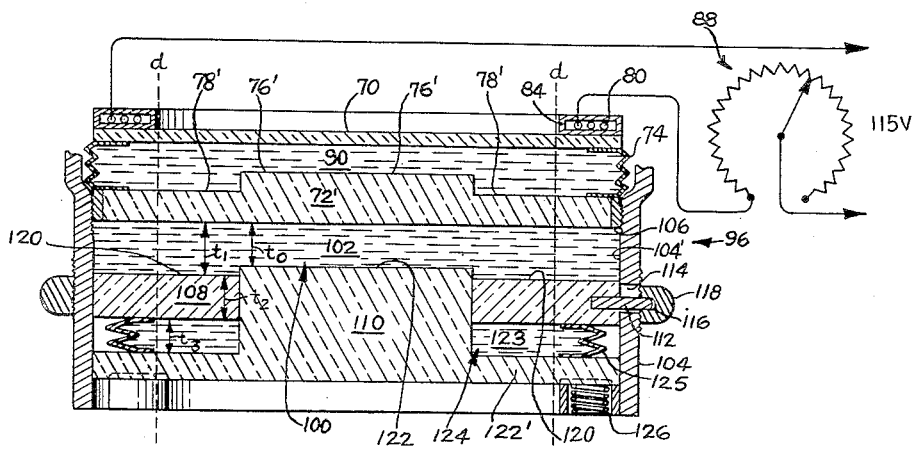
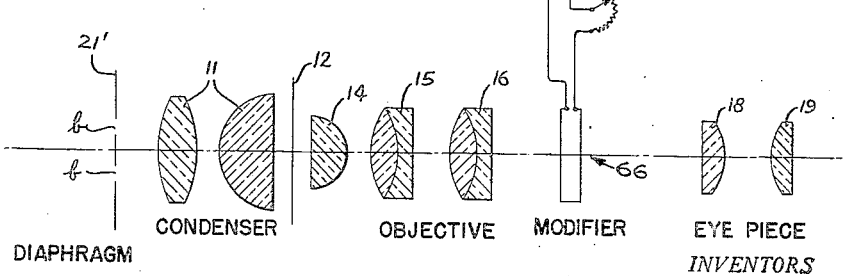

United States Patent Office 2,700,918
Patented Feb. 1, 1955

2,700,918

MICROSCOPE WITH VARIABLE MEANS FOR INCREASING THE VISIBILITY OF OPTICAL IMAGES

Harold Osterberg, Buffalo, and Alva H. Bennett, Kenmore, N. Y., assignors to American Optical Company, Southbridge, Mass., a voluntary association of Massachusetts Application January 19, 1949, Serial No. 71,746

18 Claims. (Cl. 88—39)

This invention relates to the control of the light rays incident in a microscope or the like upon an object or specimen to be observed, and of the light subsequent to its diffraction by the object, so as to control contrast in the image formed of the object, especially when the latter is so nearly uniform in transparency or surface texture (if it is an opaque or semi-opaque object) as to give little or unsatisfactory indication of structure by ordinary methods of microscopy.

This application is a continuation-in-part of our co-pending application Serial No. 681,066, filed July 2, 1946, and which issued August 1, 1950 as Patent No. 2,516,905.

A method is known of bringing out contrast in an object being studied by means of a microscope, according to which the illuminating beam is admitted through an aperture consisting of a predetermined opening formed in a diaphragm located at or near the first focal plane of a substage condenser. A cooperating disc for modifying the amplitude of the light transmitted by the object or its phase, or both, is positioned adjacent the back focal plane of the microscope objective. Accordingly the diaphragm aperture and disc are placed at the entrance and exit pupils respectively of the composite optical system made up of the microscope condenser and the microscope objective. This arrangement results in the image of the aperture being focused on the disc.

It has been previously observed by Osterberg and Schrader, as stated in their application Serial No. 456,726 filed August 28, 1942 and issued September 23, 1947 as Patent No. 2,427,689, that a single disc is not adequate to give optimum results for a variety of objects. A number of different discs are suggested in the application mentioned. It would not only be more convenient to have a single disc which would give the desired range, but if it could be gradually and uniformly varied throughout the range it could be adjusted so as to give the optimum conditions for observing each of various objects.

The present invention has for its object to provide continuously variable phase difference or amplitude ratio or both as between the deviated and undeviated spectra which form the image of the object being observed, by modifying the image forming rays in a microscope with the purpose of obtaining desired contrast in the image. By "continuously variable" is meant, throughout the present application, a gradual or progressive alteration of phase and amplitude values within a range thereof, and by "phase difference" is meant a phase relation of deviated and undeviated spectra which is different from that existing before modification. As will presently be described, alteration of the phase of either the deviated or undeviated spectra to provide a phase similarity between deviated and undeviated spectra may be employed to obtain certain contrast effects.

A basic principle of the technique mentioned above of Osterberg and Schrader of varying contrast in the image is interference between the deviated and undeviated spectra which form the image. If a point source in the aperture be considered, it will be found that not only will a bundle of undeviated rays be brought to a focus in what may be termed the conjugate area of the exit pupil of the microscope condenser and objective combined, but also there will be deviated bundles due to diffraction by the object which will pass through what may be termed the complementary area of the exit pupil. The conjugate area or zone is located at the disc and coincides with the geometrical image of the aperture formed in the above-mentioned condenser diaphragm. The undeviated bundle (also called the zero order and central maximum) passes through this conjugate area. The main portion of the deviated bundle (also called higher orders) passes through the complementary area or zone. The absorption disc or the phase modifying disc, which is the simplest instrumentality for obtaining contrast in the image being observed, is placed in this conjugate focal plane (adjacent the back focal plane of the objective). The effect of the disc upon the deviated bundle relative to the undeviated bundle is to cause a change in phase or amplitude (or both) of one bundle relative to the other, and through the phenomenon of interference, details in the object being examined are brought into contrast which otherwise would be imperceptible. "Light," as referred to herein, is not necessarily confined to those wave lengths of radiant energy to which the human eye is sensitive but may comprise other forms of radiant energy including those in the invisible portions of the spectrum.

If we consider that an object or a specimen may be made up of a plurality of particles and surrounding regions and that a given particle and its surround have a small difference in optical path (thickness times refractive index), said particle and surround, and the diffracted or deviated rays and undeviated rays emanating from portions thereof, are taken as an example for clarity of explanation. The undeviated rays emanating from the particle and the surround are spread throughout a visible image plane such as the field of an eyepiece. The deviated rays emanating from the particle, which may be retarded thereby, are brought to a focus on a part of the eyepiece field and are combined with overlapping portions of the undeviated rays to form the geometrical image of the particle. During their passage through the disc or plate, selective phase modification of the deviated and/or undeviated rays may be performed so that said combined or interfering rays forming the image of the particle reinforce or destroy one another to provide, respectively, bright or dark contrast with the undeviated substantially noninterfering rays representing the surround. Or selective absorption of the deviated and/or undeviated rays may be brought about by the disc or plate to obtain alterations of amplitude for obtaining desired contrast in the image. We have discovered that this interference and absorption phenomenon is obtained if one bundle of rays be differently polarized at the exit pupil with reference to the other bundle and advantage be then taken of this difference in polarization to introduce a relative difference in amplitude or phase (or both) between the deviated and undeviated bundles of rays. If the one bundle of rays is thus differently polarized with reference to the other, it is not required that the modification of phase or amplitude take place in the above mentioned conjugate focal place (exit pupil). It is sufficient to effect the desired modification of phase previous to formation of the image by the combined bundles of rays, and indeed the means for effecting amplitude modification can be located between the source of illumination and the exit pupil of the microscope. Moreover, said modifications may be obtained in the aforementioned progressive or gradual manner throughout a predetermined range to obtain numerous gradations of contrast. We have further discovered that other means than those involving light polarization may be employed for obtaining said variations of phase and amplitude as, for example, through thermal or mechanical changes, or both, produced in composition or form of fluid components of a modified disc or plate positioned at the conjugate focal plane.

The invention will now be further discussed in connection with the accompanying drawings in which Fig. 1 is a diagrammatic view of the optical system of a microscope operable in accordance with our invention for continuously varying the phase and/or amplitude of one of the spectra relative to the other for obtaining desired contrast in the image of the object being observed;

Fig. 5 is a front detail view of an element of the system of Fig. 1 which serves to differently polarize the deviated bundle of rays from the undeviated bundle;

Fig. 6 is a front detail view of the coresponding element of the system of Fig. 4;

Fig. 9 is a diagrammatic view showing further modifications of the optical system of Fig. 1;

Fig. 10 is a diagrammatic view of a modification of a detail of the system illustrated in Fig. 9;

Fig. 11 is a diagrammatic view of a still further modification of the optical system of Fig. 1;

Fig. 12 is a schematic view, partly in cross-section, of another modification of the invention;

Fig. 13 is a view similar to Fig. 12 of another modification of the invention; and Fig. 14 is a diagrammatic view of an optical system embodying the modification of Fig. 13.

Figure 1:
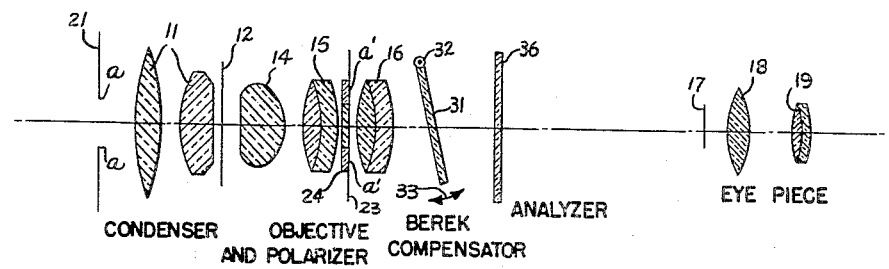

The optical system diagrammatically ilustrated in Fig. 1 includes the usual condenser lenses 11 which are disposed in the substage of the microscope. On the other side of the object plane indicated at 12 are the objective lenses. As the particular form of these objective lenses does not constitute a part of our invention, the objective lenses are shown conventionally as including a strong positive lens 14 and two doublets 15 and 16. The objective lenses form an image, in the plane 17, which may be viewed through the eyepiece comprising the lenses 18 and 19. Thus far, the constituent parts of the microscope being described are conventional and cooperate in the usual way for the viewing of a specimen or the like in the object plane 12.

The improved contrast in the image perceived by means of the eyepiece 18—19 is rendered possible through diffraction originating when the light rays pass through the object or specimen in the plane 12. A diaphragm 21 is provided, the periphery of whose aperture is indicated by $a, a$. If we consider that the object in the plane 12 is made up of a configuration of particles and that each particle produces a corresponding image in the plane 17, then any one of these particles may be taken as an example and the rays may be traced which pass through this given particle, bearing in mind the diffraction phenomenon between the given particle and the adjacent region or surround.

The condenser lenses 11 direct light from the aperture $a, a$ of the diaphragm 21 upon such a particle; and from the given particle, the light spreads out again to reproduce the aperture $a, a$ as its image $a', a'$ in the above mentioned conjugate focal plane or exit pupil 23. Not all of the light passing through the given particle is confined to this one bundle of rays which is known as the undeviated bundle, but due to the above mentioned diffraction phenomenon, some of the light passing through the given particle is deviated and is outside of that incident the conjugate area $a', a'$ (the undeviated bundle).

If we were to follow the technique described in the above-mentioned patent of Osterberg and Schrader, a disc would be inserted in the plane 23 for varying the amplitude and phase of the undeviated bundle of rays $a', a'$ relative to amplitude or phase or both of the deviated bundle of rays surrounding the area $a', a'$. In order to place at the disposal of the microscopist continuous variation as between the deviated and undeviated bundles or spectra, polarizing means 24 of the character illustrated in Fig. 5 is arranged in the plane 23. Such polarizing means may be applied on the surface of one of the objective lenses, or as shown in Fig. 1 may be carried by a separate element in the form of a disc or plate. The central area 25 of the polarizing means 24 corresponds to the above mentioned conjugate area $a', a'$ and accordingly it accurately conforms to the undeviated bundle of light passing through or emanating from a given particle in the object plane 12. The surrounding area 26 of the polarizing means 24 is the so-called complementary area through which most of the deviated bundles of rays pass.

In order to differently polarize the conjugate area 25 from the complementary area 26, we prefer to mount on one of the objective lenses or to mount between thin lamellae of optical quality glass (which mounting thus constitutes an element separate from the objective lenses) two portions of polarizing sheeting such as is well known and in commercial use for many optical purposes at the present time. One portion is of the size and shape of the conjugate area 25 and has its axis of polarization in any given orientation, for instance, as indicated by the arrow 28. The other portion is of the size and shape of the annulus 26 or complementary area, and may also be of the like polarizing sheeting. It will have its axis of polarization differently disposed, as for instance indicated by the arrow 29. It will be assumed, unless otherwise specified, that the arrows 28 and 29 are not necessarily at right angles to each other, since in the broad aspect of our invention it is merely necessary to differently polarize the area 25 from the area 26. Even though the different portions do not have their axes of polarization substantially at right angles to each other, a variation in phase or amplitude may be accomplished. If desired, one of the areas 25 and 26 could be mounted for rotation relative to the other, or the entire element 24 could be mounted for rotation to provide greater flexibility. The particular embodiments illustrated, however, give best results when the axes of polarization are arranged at right angles to each other.

With the optical system of Fig. 1 as thus far described, each particle and surround of the object in the plane 12 gives rise to an undeviated bundle of rays passing through the polarizing area 25 and a deviated bundle of rays passing through the differently polarized area 26. The polarization alone of these rays or spectra would not give rise to any greater contrast in the image produced; but because the deviated and undeviated bundles are differently polarized, it is possible to cause them to undergo suitable modification at any subsequent location prior to the formation of the desired image, and through such modification to bring about increased contrast.

In the embodiment illustrated in Fig. 1, a simple instrumentality is employed in the form of a birefringent plate 31 pivoted at 32 for tilting as indicated by the double headed arrow 33. With this plate 31 cooperates a polarizing element 36 such as a suitably protected sheet of polarizing material such as that above-mentioned. This birefringent plate 31 is constructed with its optic axis normal to the plane of said plate and with its crystallographic X axis in the plane of said plate, and is so mounted in the system that its X axis is parallel to one axis of polarization and perpendicular to the other of the areas 25 and 26 (Fig. 5). A calcite plate is an excellent example of an element which may be used as the birefringent plate 31. In general, after passing through the plate 31, either one or the other of the deviated bundle of rays or the undeviated bundle is composed of ordinary rays. The other is composed of extraordinary rays, and the relative velocities of said rays are modified to provide an alteration of relative phase of their vibrational components. Because the plate 31 can be tilted about the pivot 32 with reference to the polarizing means 24 and the polarizing element 36, the phase difference of the two bundles can be varied gradually and continuously by tilting the plate 31 from normal as indicated by the arrow 33. This plate 31 is in this relation, therefore, essentially a Berek compensator.

Mere difference in phase, which can be introduced by tilting of the plate 31, will, in conjunction with a given polarizing or vibration direction of the analyzer 36, in some instances provide a satisfactory image of the object under observation. With other specimens, it may be desirable to introduce instead a variation in the amplitude ratio and in still others it may be that the best contrast is obtained by introducing changes in the phase and the amplitude. To provide for this, the polarizing analyzer 36 is so mounted as to be rotatable about the optical axis of the microscope, as is commonly the fashion with the analyzer of a polarizing microscope.

In the operation of a microscope having an optical system such as illustrated in Fig. 1, the diaphragm 21 is adjusted so that the image $a', a'$ of its aperture $a, a$ coincides with the conjugate area of element 24. It may be found desirable to do this at the factory when the microscope is assembled. The polarizing means may also be permanently located in the exit pupil of the lens system made up of the lenses 11, 14, 15 and 16. When an object is being observed which has such uniform transparency that but little detail can be perceived by ordinary methods, the contrast in the image can often be improved by adjustment of either the tiltable plate 31 or the rotatable analyzer 36 or both. The analyzer 36 will, upon rotation, bring about in a continuous manner such variation in the amplitude ratio between the deviated and undeviated bundles as to take advantage of any characteristics that the object under observation may have. For instance, various portions of the object may appear to be equally transparent and yet because of differences in refractive index or other differences may impart variations to the light transmitted by these various portions of the object.

The plate 31 has its X axis parallel to the axis of polarization of either the deviated or the undeviated bundle of rays. The phase of one of these bundles can, therefore, be varied continuously to introduce any desired phase difference between the deviated and undeviated spectra. As pointed out in said patent of Osterberg and Schrader, it is of advantage to introduce a variation not only in the amplitude ratio but also in the phase difference and frequently to make use of both simultaneously. The optical system illustrated in Fig. 1 has been arranged so that not only can both be varied but they can both be varied gradually and continuously and thus contrast in the image can be varied.

Figure 2:
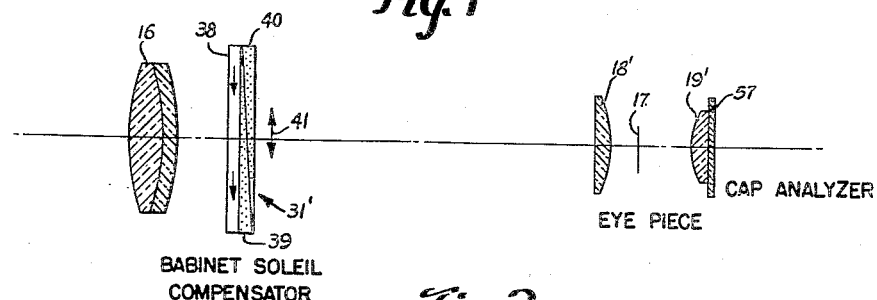
Fig. 2 is a diagrammatic view of a modification of a detail of the system illustrated in Fig. 1.

A greater range of phase change can be obtained by substituting a Babinet Soleil compensator for the Berek compensator shown at 31 in Fig. 1. Such a Babinet Soleil compensator is illustrated in Fig. 2. This compensator indicated in general by the numeral 31' is made up of a birefringent plate 38 such as a quartz plate and two birefringent wedges 39 and 40. These wedges are also preferably of quartz. The optic axes of the two wedges are parallel to each other and perpendicular to the optic axis of the plate 38, the latter axis being in the plane of the plate 38. The optic axis of the latter is arranged parallel either to the arrow 28 or to the arrow 29 so that the relative phase of the deviated and the undeviated bundles may be continuously varied. Such variation in phase is brought about by relative movement between the wedges 39 and 40 in the direction indicated by the double arrow 41. Such operation of the Babinet Soleil compensator performs the same function as the tilting of the Berek compensator 31 illustrated in Fig. 1, this Babinet Soleil compensator being substituted in that optical system for the plate 31. Another form of compensator which may be substituted for the plate 31 in the optical system of Fig. 1 is the device illustrated in Fig. 3. This is a combination of a birefringent plate 43 with a long thin slow birefringent wedge 44. Operation of this device is effected by sliding the wedge 44 relative to the plate 43 as indicated by the double headed arrow 45. In this device the optic axis of the wedge 44 is perpendicular to the optic axis of the plate 43 and each of these axes is in the plane of its element 43 or 44. This device performs the function of the compensator shown at 31 in Fig. 1 and may be substituted therefor in order to bring about the continuous and gradual variation in phase between the deviated and undeviated spectra. However the compensator 31 or 31' is preferred thereto.

Figure 4:
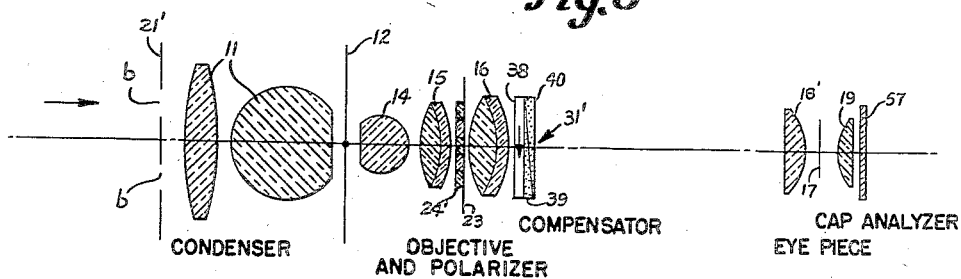
Fig. 4 is a diagrammatic view similar to Fig. 1 of the optical system of a microscope provided with a different form of diaphragm and corresponding instrumentalities for continuously varying the phase and/or amplitude of the respective spectra relative to each other.

The optical system of Fig. 4 shows, by way of illustration, two respects in which the optical system of Fig. 1 may be varied. The aperture $a, a$ of the latter system may be inferior for certain purposes to an annular aperture such as shown at $b, b$ in Fig. 4. The image of the annular aperture $b, b$ which is formed in the conjugate focal plane 23 is also annular. Accordingly the means 24' for differently polarizing the deviated and the undeviated bundles of rays is formed in three portions as shown in Fig. 6. The central portion 49 is a circular area forming part of the complementary area and is surrounded by an annular conjugate area 50, through which pass the undeviated bundles or rays. The annular complementary area 51 surrounds the conjugate area 50. The direction of polarization of complementary areas 49 and 51 should be the same and angularly related to the direction of polarization of the annular conjugate area 50, the arrows 53, 54 and 55 indicating respectively the directions of polarization of the areas 49, 50 and 51.

The relation between the undeviated bundles of rays and the deviated bundles of rays is somewhat different in the optical system illustrated in Fig. 4 from that in the optical system of Fig. 1, inasmuch as the undeviated bundles or rays, originating in the annular aperture $b, b$, both surround deviated bundles of rays and are enclosed by deviated bundles of rays, and so the interference effect may be different.

Figure 3:
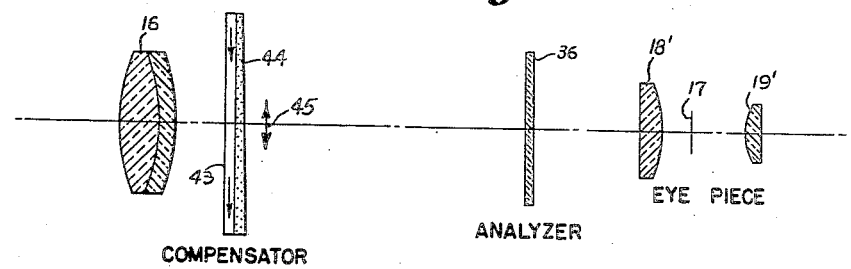
Fig. 3 is a similar view of another such modification.

The instrumentality for cooperating in varying the phase difference of these bundles of rays may be the tiltable plate 31 or a more elaborate device for this purpose such as those illustrated in Figs. 2 and 3. The amplitude ratio may be varied by an analyzer 36 disposed as shown in Fig. 1, or if more convenient a cap analyzer 57 disposed as shown in Figs. 2 and 4 may be rotated to vary the amplitude ratio. This may either be done simultaneously with the variation of the phase difference or separately, as called for in obtaining the desired contrast in the image.

Figure 7:
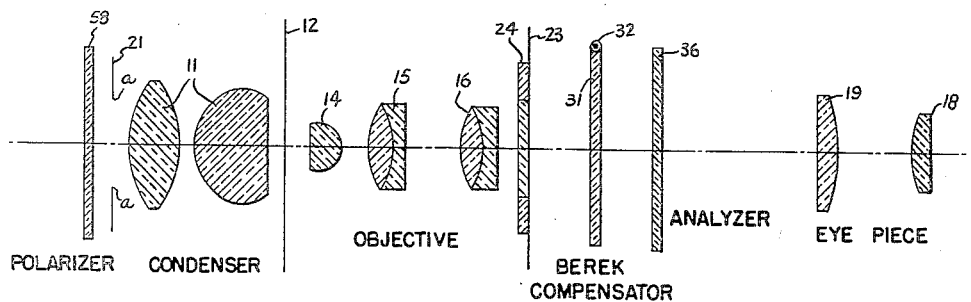
Fig. 7 is a diagrammatic view of a further modification of the optical system of Fig. 1.

In Fig. 7 is illustrated an optical system having improved means for controlling the amplitude ratio between the deviated and undeviated bundles of rays. The light passes through an aperture $a, a$ of the diaphragm 21, and is directed upon the object or specimen by a condenser 11 as before. The polarizing means 24 is at the exit pupil of the composite system made up of the condenser 11 and objective lenses 14, 15 and 16. An adjustable retardation plate, such as a Berek compensator 31, is arranged between the polarizing means 24 and the analyzer 36 so that the image viewed through the eyepiece 18, 19 may be improved by adjusting the compensator and thus varying the phase difference between the deviated and undeviated spectra. As thus far described, the optical system of Fig. 7 does not differ in important respects from the system of Fig. 1.

The addition of a polarizer 58, which may for instance be made in substantially the same way as the polarizing element 36, for polarizing the light reaching the polarizing means 24 and for varying the direction of polarization of that light, has valuable advantages. This polarizing element 58 which is mounted for rotation about the optical axis of the system may be variously located along the optical axis, provided it precedes the polarizing means 24 so as to polarize the light passing thereto; but we prefer to locate the polarizer 58 below the condenser. When this polarizer 58 is rotated, thereby altering the direction of polarization of the light passing to the polarizing means 24, the amplitude ratio above referred to is varied with a minimum of disadvantageous effect upon the sharpness or crispness of image observed. When the system includes the polarizer 58, it is unnecessary to rotate the analyzer 36 (or cap analyzer 57) and the axis of the latter may be fixed relative to arrows 28 and 29. However, for further flexibility in obtaining amplitude values the analyzer may also be mounted for rotation. Alternatively, element 24 may have its conjugate and complementary portions formed, respectively, of right-handed and left-handed quartz or of half-wave retardation plates, the optic axes of said portions being so relatively oriented as to provide emergent vibration components which are at right angles to one another.

Figure 8:
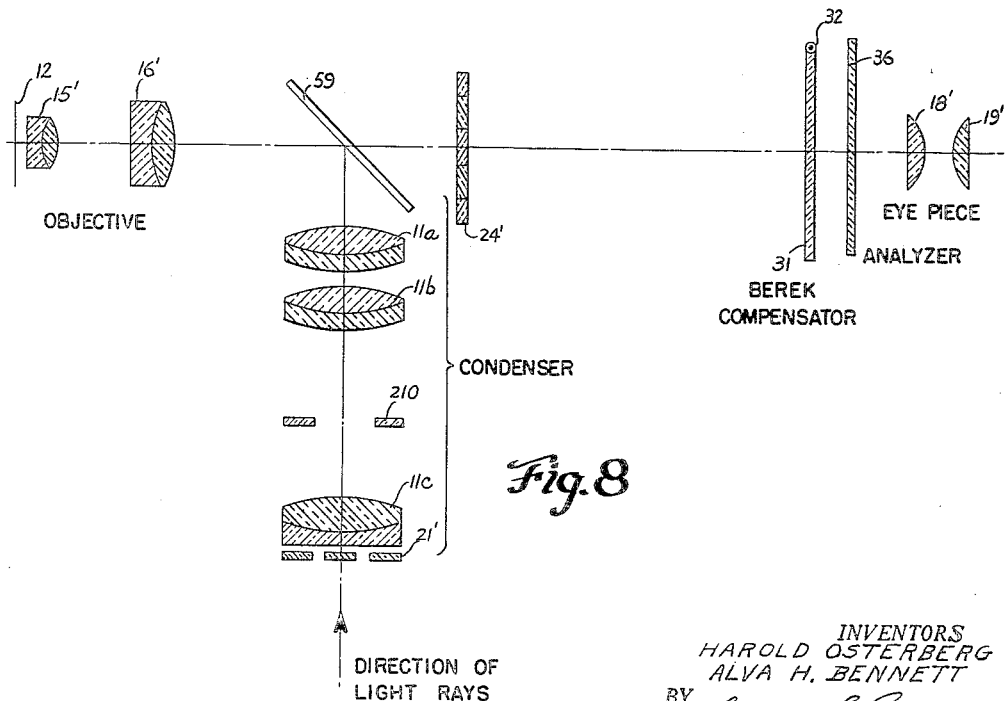
Fig. 8 is a diagrammatic view of the optical system of a microscope embodying our invention when adapted to the study of opaque or semi-opaque objects which do not lend themselves to illumination by light transmitted through the object.

Fig. 8 illustrates how our invention may be employed when the light for illuminating the object is not transmitted therethrough. A reflecting opaque or semi-opaque object in the plane 12 is imaged by the objective 15', 16' so that this image may be observed through the eyepiece 18', 19'. As is usual in using a vertical illuminator, a semi-reflecting mirror 59 is tilted 45° with relation to the optical axis of the microscope to reflect upon the specimen light received from a light source (not shown). In addition to the lenses 11a, 11b and 11c for concentrating the light upon the specimen, there is provided a field stop iris 210. Considering the lenses 11a, 11b, 11c, the objective lenses 15', 16' and the reflecting surface of the specimen in the plane 12 as a composite system, an aperture diaphragm 21' is disposed at the entrance pupil of this system and polarizing means 24' are disposed at the exit pupil of this system. The remainder of the system is substantially the same as the one illustrated in Fig. 1, variation in phase difference between the deviated and undeviated spectra being brought about by means of an adjustable retardation plate 31 pivoted at 32 and variation in amplitude ratio being brought about by rotation of analyzer 36 about the optical axis of the microscope.

If now we come to a situation in which it is desirable to vary the relative amplitude in a gradual and continuous manner and to vary the phase difference either gradually or in steps, we may resort to the instrumentalities illustrated in Figs. 9 and 10. The form of aperture may be varied, but for purposes of illustration, the simpler form of aperture a, a has been shown. Accordingly the polarizing means in plane 23 is of the type shown in Fig. 5. In place of the compensator described in connection with Fig. 1, we have substituted a birefringent plate or a series of birefringent plates 60a, 60b, 60c, etc. each having its optic axis in the plane thereof. It a series is employed, the plates are selected to have different retardations, and the same are understood to be rotatably mounted in a slide or in a ring so carried by the microscope that any one of the series may be slid or swung into alignment with the optical axis of the instrument, and so oriented that the optic axis of the plate is parallel to either the arrow 28 or the arrow 29 (Fig. 5), thereby giving any one of the various retardations of the series. As many birefringent plates are used as are required to obtain a desired range of retardation. Under some circumstances but one birefringent plate is needed. When a given birefringent plate is aligned with the optical axis of the microscope, and the plate is rotated 90° about that axis, a reversal of contrast in the image is generally observed, inasmuch as the sign of the change in phase is reversed. As this is often useful in obtaining a more definite indication of structure in the object, it is preferable to mount each birefringent plate so that it may be rotated through 90° about the axis of the microscope when the plate is aligned therewith.

Figure 10 illustrated a more flexible modification of the arrangement of Fig. 9. Here a series of birefringent plates 61a, 61b, 61c, etc. are all permanently arranged on the optical axis of an optical system having the general characteristics described in connection with Fig. 9. These plates 61a, 61b, 61c, etc. may have their respective optic axes parallel to either arrow 28 or arrow 29 (Fig. 5) and, accordingly, these optic axes may at times be parallel to each other and at other times perpendicular to each other since these plates 61a, 61b, 61c, etc. are likewise mounted for individual and collective rotation about the microscope axis through 90°. If we take, for example, a set of four plates whose retardations vary as 4, 3, 2 and 1 respectively, we have available eleven different effective retardations including zero by selecting various combinations of the plates for rotation about the optical axis of the instrument. As above mentioned, gradual alteration of phase values may be obtained by rotation of the plates within the 90° range and where such use is intended, it is preferable to add a rotatable polarizer 58 (shown in dotted form) so that amplitude ratios may be varied by rotating the same as described with respect to Fig. 7.

If a further refinement of any of the foregoing optical systems is desired, the system may be specially designed so that the light passing through the plate 31 or any variant thereof, and also that passing through the analyzer is parallel light. Fig. 11 illustrates one such optical system in which this is accomplished. The aperture a, a is imaged in the plane 23 as before. Furthermore, the deviated and undeviated spectra are differently polarized as before. After being polarized, the converging image-forming rays are rendered parallel by the diverging lens 63 and thereafter are rendered convergent again by lens 64. Such infinity corrected systems are known in other relations, and we have found them advantageous in the present relation for the purpose of minimizing the effects of conical refraction and avoiding the tendency of a plate of finite thickness to form a double image in convergent light. This improvement is accomplished by disposing the compensator 31 or 31', the wedge 43, 44 or the birefringent plates of the system shown in Figs. 9 or 10 and/or the analyzer 36 in the parallel light between lenses 63 and 64. For purposes of illustration the series of plates 61a, 61b, 61c, etc. in addition to the analyzer 36 are shown disposed in this relation in Fig. 11.

In all of the foregoing examples of how our invention may be applied to the solution of the problem of bringing out contrast during microscopic study and observation, for a given particle and surround, there are undeviated bundles of rays and deviated bundles. Control is effected of these bundles of rays, in each instance, by differently polarizing one bundle with respect to the other. Advantage is then taken of such polarization to introduce a differential in a wave characteristic between the deviated and undeviated rays. This difference in a wave characteristic may be a difference in phase, or it may be a difference in amplitude, or it may be both. What is meant by the aforementioned wave characteristic is, for example, the direction, amplitude and phase of one or more vibrational components (electric vectors), which may be controlled by suitable polarizing and birefringent elements of the type described herein. So flexible is our invention that a gradual and uniform variation of the amplitude ratio between the two bundles or of the phase difference between the two bundles or a variation of both amplitude ratio and phase difference may be produced and controlled so as to bring about improved contrast in the image of a given specimen.

There are considerable advantages to polarizing the deviated and undeviated bundles at the exit pupil of the composite optical system including the microscope objective. There are certain advantages, for instance, in that with this arrangement the light rays may be polarized after they leave the object. A further advantage is that the source of light may be below the object in case the latter is to be studied by transmitted light or may be incorporated in a vertical illuminator in case the object is to be studied by reflected light. In accordance with our invention the deviated or the undeviated bundles of rays need not undergo a change in phase or a modification of amplitude at the above-mentioned exit pupil. As shown by examples given, the gradual and uniform variation in phase of one of these bundles of rays relative to the other can be effected by an adjustable wave plate such as a compensator, or the variation in amplitude can be effected by an analyzer associated with the microscope eye piece.

Means for effecting the foregoing phase and amplitude modifications by altering the light transmitting properties of a fluid will now be described. In Fig. 12, a device 66 is shown in cross-section for permitting a gradual modification of the relative phase of undeviated and deviated spectra by thermally treating a transparent fluid component of the device, through which said spectra is transmitted. Said device is adapted to be mounted substantially at or adjacent the back focal plane of the objective lens system of a microscope as illustrated in Fig. 14 for use with diaphragm 21' thereof. Element 66 is preferably circular in form and includes an expansible fluid-tight chamber 68 formed by a pair of circular glass plates 70 and 72 which are interconnected adjacent their peripheries by suitable means permitting bodily movement of one plate toward or away from the other. Said arrangement enables a fluid contained in the chamber to expand or contract when subjected to temperature changes. A suitable interconnecting means is shown in the form of an annular bellows as, for example, a metallic bellows 74 which is bonded to peripheral regions of plates 70 and 72, it being understood that components attached to one side of the bellows are fixed with respect to the carrying tube of a microscope (not shown) while those at the other side are free to move therein. Plate 72 may be of any suitable form for separately defining the conjugate and complementary zones, above described. In the example of Fig. 12, the recessed annular area 76 represents the conjugate zone and the remaining portions 78 lying transversely within dotted lines d—d represent the complementary zone. Means for applying heat to said chamber comprise a suitable resistance element such as a pair of annular heater coils 80 and 82 which are mounted adjacent external surfaces of plates 70 and 72, casing components 84 and 86 for said coils being shown as bonded to said plate surfaces whereby heat may be transmitted by the plates substantially throughout chamber 68. Any suitable means for providing a variable electrical current to the heater coils, so that the temperature of chamber 68 may be varied, may be employed as, for example, a variable resistance 88. A suitable transparent fluid 90 which has the characteristic of changing in refractive index when its temperature is altered is confined within chamber 68. Examples of such a fluid are carbon chlorobenzene, carbon disulfide, bromonaphthalene, or methylene iodide.

Gradual variation of the relative phase of undeviated and deviated spectra, which are transmitted, respectively, by conjugate zone 76 and complementary zone 78 and portions of the device superposed therewith, to provide a progressive alteration in contrast between a particle and its surround, is achieved through the changes of refractive index which occur under temperature changes of the fluid. More particularly, the variation of relative phase is obtained through said change of refractive index in that portion of the fluid which is contained in recessed annular conjugate area 76 and which differs in thickness from other portions within the complementary zone said difference of thickness being represented by double-headed arrow 92. The variation of refractive index of a selected glass, under temperature changes contemplated, is so small that it may be neglected in the present consideration. Since optical path difference equals the difference of refractive index times thickness between the compared areas, any given refractive index of fluid 90, at a given temperature, multiplied by the thickness represented by arrow 92 is to be compared with a substantially unchanging refractive index of glass multiplied by a similar thickness thereof represented by arrow 94. It will be seen that all other portions of the fluid, namely the thickness overlying all of the complementary zone of plate 72 and a like thickness overlying the conjugate zone, have no transversely adjacent portions of glass with which to be compared and thus offer no areas for comparison of optical path differences.

Operation of device 66 for selectively modifying wave characteristics or components of the rays to provide a gradual variation of optical path relationships between the conjugate and complementary zones and thus to obtain a gradual variation of the phase relationship of the undeviated and deviated spectra is obtained by adjustments of variable resistance 88. For example, at 40° C. the index of refraction of carbon disulfide is lower than that of the glass employed and relative retardation of the deviated spectra in the complementary zone occurs. At 20° C. the index of refraction of carbon disulfide is higher than that of the glass and relative retardation of the undeviated spectra in the conjugate zone ensues. At various other temperatures between the foregoing temperatures other phase relationships occur, and at some intermediate temperature the refractive index of carbon disulfide and of the glass are identical and zero relative retardation prevails. It is to be understood that either or both of the complementary and conjugate zones may also have suitable retardation and absorption coatings applied thereto for providing given phase and amplitude modification, in addition to the variable means, above described. Such coatings could, respectively, be composed of a dielectric or a metal.

A further explanation, involving a mathematical consideration of the foregoing thermally induced operations is as follows: If a range of relative path differences is provided between the conjugate and complementary zones of plus or minus $$\frac{\lambda}{2}$$

it is sufficient for substantially all types of plus or minus contrast effects. The temperature range enabling the plus or minus $$\frac{\lambda}{2}$$

range should be below the boiling point of $CS_2$ at the upper range limit and preferably should not be below normal room temperature at the lower range limit. As stated above, a glass is employed for certain of the components which does not vary perceptibly in refractive index within the temperature range contemplated.

Let $N_g$ denote the substantially constant refractive index of the glass used and let $N_{f,40}$ denote the refractive index of the fluid $CS_2$ at 40° C. For a type of dense barium crown glass, $N_g$ is 1.61700. Assuming, for example, a yellow light source, $N_{f,40}$ is 1.60914. At 40° C., the thickness $t$ (arrow 92, Fig. 12) required in order to obtain a relative retardation of $$\frac{\lambda}{2}$$

in the deviated bundle is given by the formula:

$$(N_g - N_{f,40})t = \frac{\lambda}{2}$$

Substituting the above data in the formula and taking $\lambda$ (wave length of yellow light) as 0.0005893 mm., we have:

$$(1.61700 - 1.60914)t = \frac{0.0005893}{2}$$

$$.00786t = .0002947$$

$$t = .037 \text{ mm.}$$

(thickness of fluid indicated by arrow 92, Fig. 12).

If the thickness $t$ (Fig. 12, arrow 92) of fluid is increased or, otherwise stated, if the depth of the recessed conjugate area is increased, a greater retardation range is obtained. Hence it is possible to choose a depth of the recessed zone so large that at 40° C. the relative retardation of the deviated bundle with respect to the undeviated bundle is at least $$\frac{\lambda}{2}$$

for all wavelengths in a beam of white light.

To determine the lower temperature necessary to obtain a retardation of the undeviated bundle with respect to the deviated bundle for the yellow light, we compute the index $N_{f,x}$ which denotes the index of $CS_2$ at the unknown temperature $x$ in accordance with the formula:

$$.037 N_{f,x} - .0598 = .0002947$$

$$N_{f,x} = \frac{.0600947}{.037} = 1.62418$$

Since $CS_2$, at 20° C. has a refractive index of 1.62546, the temperature $x$ is approximately 20° C.

To summarize, at about 20° C. the optical path through the conjugate area exceeds that through the complementary area by $$\frac{\lambda}{2}$$

whereas at 40° C. the optical path through the complementary area exceeds that through the conjugate area by $$\frac{\lambda}{2}$$

The device 96 illustrated in Fig. 13 provides another modification for differentially affecting components or wave characteristics of light and combines means for varying the relative phase of undeviated and deviated bundles of rays in a manner generally similar to that of device 66 with other means for permitting a gradual modification of the relative amplitude of said bundles of rays. The phase modifying components are similar to those of device 66 excepting that one heater coil is deleted and glass plate 72' has conjugate and complementary zonal portions 76' and 78' which are differently formed and are adapted to use with diaphragm 21 of Fig. 1. The different thickness of fluid and glass portions horizontally adjacent one another enables phase modifications as previously described. Device 96 may be substituted for device 66 in the optical system of Fig. 14 provided diaphragm 21 is employed therewith.

Components of device 96 for gradually varying the relative amplitude of deviated and undeviated spectra comprise a fluid-tight chamber 100 containing a light absorbing dye 102. Said chamber is formed, respectively, by fixed glass plate 72' having a mounting rim 106 threadedly engaged with carrying tube 104, by portions 104' of the carrying tube, and by glass plates 108 and 110 which are slidably movable longitudinally of the carrying tube. Glass plate 108 is an annular element slidably mounted and forming a fluid-tight seal with respect to carrying tube 104 and glass plate 110. Means for bodily moving plate 108 toward and away from fixed plate 72' comprise a plurality of projecting members such as pins 112 which extend radially outwardly from plate 108 and through a plurality of slots 114 formed in carrying tube 104. The extremities of said pins extend within a groove 116 formed in an adjusting collar or ring 118 which is threadedly engaged with the external surface of carrying tube 104, said extremities of the pins being slidably mounted in the groove. Movement of ring 118 longitudinally of the carrying tube 104 serves to carry plate 108 therewith according to the direction of movement. Areas 120 of plate 108, lying within dotted lines d—d, form a part of the complementary zone of the device. Glass plate 110 which is also mounted for slidable movement with respect to carrying tube 104 and plate 110 comprises a portion 122 which forms a part of the conjugate zone of the device and other portions 122' which form a part of the complementary zone. A transparent fluid 123 having the same index of refraction as the glass of plates 108 and 110 is contained in a chamber 124 formed in part by said plates and in part by metallic bellows 125, the function of said fluid being described hereinafter. A plurality of spring members 126 serve to bias plate 110 in a direction toward fixed plate 72'.

The fluid contained in chamber 100 is of any suitable light absorbing type and, for example, may be composed of colloidal carbon particles suspended in oil. In operation, the device serves to gradually decrease or increase the thickness of the layer of fluid superposed with complementary zone 120 while simultaneously performing a reverse procedure with respect to the thickness of said layer of fluid superposed with conjugate zone 122. Said variation of relative thickness of the layers of fluid in the two zones is achieved by turning threaded ring 118 and thus carrying plate 108 in a direction according to the direction of longitudinal movement of said ring. As shown in Fig. 13, when plate 108 is carried upwardly to decrease the thickness of the fluid layer 102 in the complementary zone, the fluid hydraulically forces plate 110 downwardly, against the bias of springs 126, and is increased in thickness in the conjugate zone. When plate 108 is carried downwardly, thus increasing the thickness of fluid 102 in the complementary zone, the hydraulic pressure in chamber 100 is relieved, the bias applied by springs 126 forces plate 110 upwardly, and the thickness of fluid 102 in the conjugate zone is decreased. The function of transparent fluid 123 is to provide a continuity of transparent components in the complementary zone which have an identical refractive index. It is to be understood that bellows 125 maintain a constant space of chamber 124 with movement of plates 108 and 110 in either direction, and thus insure that fluid 123 is in contact with both plate 108 and plate portion 122' at all times. In accordance with the above-described operation of amplitude modifying components, it will be apparent that relative amplitudes of spectra transmitted by the conjugate and complementary zones may be gradually altered by adjusting the ring or collar 118. It is to be understood that either of the phase and amplitude components which are combined in device 96 may be employed separately as individual units, it being necessary only to substitute a flat glass cover plate for plate 72' to provide a unit for modifying the amplitude of light passing therethrough.

A mathematical consideration of the amplitude modifying components of device 96 (Fig. 13) follows: Assume that elements 108, 123 and 110, Fig. 13 have the light transmission unity. This should be substantially the case if plates 108 and 110 are formed of glass such as spectacle crown and if fluid 123 is crown immersion oil. Let fluid 102 be crown immersion oil with finely divided carbon particles or the like distributed therethrough for the purpose of making the fluid light absorbing. Let thicknesses $t_0$ and $t_1$ be measured in mm. and represent the thicknesses of fluid shown in Fig. 13. It is only the relative values of $t_0$ and $t_1$ which are of importance in determining the amplitude ratio of the deviated bundles of rays once a given fluid has been selected. Where $\beta$ is the transmissivity of the fluid:

If $T_0$ is the energy transmission of the column $t_0$, (1) $\qquad T_0 = e^{-\beta t_0}$ If $T_1$ is the energy transmission of the column $t_1$, (2) $\qquad T_1 = e^{-\beta t_1}$ Let R be the energy transmission ratio of the conjugate area to that of the complementary area, then (3) $\qquad R = \dfrac{T_0}{T_1} = e^{-\beta(t_0 - t_1)}$ Thus (4) $\qquad \log_e R = (t_0 - t_1) \log_e e^{-\beta} = (t_0 - t_1) \log_e \mathscr{T}$ Therefore (4a) $\qquad \log_{10} R = (t_0 - t_1) \log_{10} \mathscr{T}$ in which $\mathscr{T}$ is the light transmission per mm. of the absorbing fluid. $\mathscr{T}$ of any fluid may be measured by a spectrophotometer.

Let us now evaluate $\mathscr{T}$, $t_0$ and $t_1$ so that R can be varied from 0.10 to 4.0. This range in the energy transmission ratio R covers the range of amplitude modification of plates now in commercial use.

Let $R = 0.10$ when $t_{0,0} = 4$ and $t_{1,0} = 0.5$.
Then $\log_{10} 0.10 = 3.5 \log_{10} \mathscr{T}$.

(5) $\qquad \log_{10} \mathscr{T} = \dfrac{-1}{3.5} = -0.285714$ (6) $\qquad \log_{10} \mathscr{T} = 9.714286 - 10$ (7) $\qquad \mathscr{T} = .51795$ Hence sufficient carbon particles should be mixed in the fluid so that its light transmission for 1 mm. thickness is 0.51795 or 51.795%.

From Equations 4 and 5

(8) $\qquad \log_{10} R = -(t_0 - t_1) 0.285714$

Thus, at $R = 4.0$ (9) $\qquad t_0 - t_1 = \dfrac{-\log_{10} 4}{0.285714} = \dfrac{-0.60206}{0.285714} = -2.10721$ Thus $t_1 > t_0$ as it should be.
In particular, at $R = 4.0$

(10) $\qquad t_1 = t_0 + 2.10721$

Assuming, for example, that the surface area of plate 108 (Fig. 13) is 2.2 times that of plate 110, then plate And at $R = 0.10$

(11) $\qquad t_0 = t_{0,0} = 4;\ t_1 = t_{1,0} = 0.5$

110, when hydraulically actuated in an opposite direction to that in which plate 108 is moved, travels 2.2 times as fast as the latter. When $R = 0.10$, $t_0 = t_{0,0} = 4$ mm., while $t_1 = t_{1,0} = 0.5$ mm. These may be considered as initial conditions. Let $t_1$ increase $q$ mm. Then $t_0$ decreases by $2.2\ q$ mm.
Hence

(12) $\qquad t_1 = t_{1,0} + q$

(13) $\qquad t_0 = t_{0,0} - 2.2q$

Now at $R = 4.0$, from Equation 10

$$t_{1,0} + q = t_{0,0} - 2.2q + 2.10721$$
$$0.5 + q = 4 - 2.2q + 2.10721$$
$$3.2q = 5.60721$$

(14) $\qquad q = 1.752$ mm.

Therefore

(15) $\qquad (t_1)_{R=4} = t_{1,0} + (q)_{R=4} = 2.252$ mm.

(16)
$\qquad (t_0)_{R=4} = t_{0,0} - 2.2 \times 1.752 = 4.000 - 3.854 = 0.146$ mm.

The amplitude modifying components of device 96, namely those including and positioned below the lower surface of plate component 72', may alternatively be employed to form an individual phase modifying unit by substituting a flat glass plate for plate 72', and by substituting a suitable clear fluid of appropriate refractive index for the light absorbing fluid 102. A mathematical consideration of such a phase modifying unit follows: Let us assume, for example, that components 108 and 110 are formed of a suitable glass with an index of refraction $n = 1.51250$; that fluid 123 is crown oil of index $n = 1.51281$, and that fluid 102 is Shillaber oil of index $n = 1.51444$. Let the thickness of the portion of fluid 102 which is superposed with component 110 be represented by $t_0$; the thickness of that portion superposed with component 108 be designated by $t_1$; the thickness of fluid 123 be shown as $t_3$, and the thickness of component 108 be considered as $t_2$. The above indices may be regarded as those prevailing for a temperature of 25° C. and for a sodium yellow light source. Let $\Delta n$ be the difference in refractive index between the glass and the Shillaber oil, and $\Delta n_c$ be the difference between the glass and the crown oil, then (1) $\quad \Delta n = 1.51250 - 1.51444 = -0.00194$ (2) $\quad \Delta n_c = 1.51250 - 1.51281 = -0.00031$ Let the optical path difference between the conjugate and complementary areas or zones be denoted by $\phi$ as measured in mm. Then, in general (3) $\quad \phi = (t_1 - t_0)\Delta n + t_3 \Delta n_c$ As an initial condition, let us assume, for example, that $$\phi = +\frac{\lambda}{2}$$

so that the optical path of the conjugate area exceeds that of the complementary area by one-half wave length. Then (4) $\quad \phi = \frac{\lambda}{2} = (t_{1,0} - t_{0,0})\Delta n + t_{3,0}\Delta n_c$ in which $t_{1,0}$, $t_{0,0}$ and $t_{3,0}$ are the initial values of $t_1$, $t_0$ and $t_3$, respectively.

The oil herein referred to as Shillaber oil is manufactured by the Cargyle Scientific Instrument Specialty Co., New York, New York.

In our example, we now select $t_{1,0} = 0.2$ mm.

(5) $\quad t_{3,0} = 0.5$ mm. $\quad \lambda = 0.589 \times 10^{-3}$ mm.

It follows from Equations 4 and 5 that (6) $\quad t_{1,0} - t_{0,0} = -0.2741$ mm.

so that $t_{0,0} = 0.4741$ mm.

$t_{1,0} = 0.2$ mm.

(7) $\quad t_{3,0} = 0.5$ mm.

as the initial setting at which $$\phi = +\frac{\lambda}{2}$$

Now, let the displacement of element 110 be denoted by $y$ with $y$ considered to be positive as 110 is moved downward from the above-described initial condition. If the area of the surface of component 108 is 2.2 times that of the surface of component 110, then component 110 is moved hydraulically 2.2 as fast as component 108. Hence, for any subsequent value of $y$ through which 110 is moved from the initial position where $\phi = \phi_0 = +\frac{\lambda}{2}$ $t_0 = t_{0,0} + y$ $t_1 = t_{1,0} - \frac{y}{2.2}$ (8) $\quad t_3 = t_{3,0} + y + \frac{y}{2.2}$ From Equations 3 and 8

$\phi = \Delta n\left[t_{1,0} - t_{0,0} - y\left(1 + \frac{1}{2.2}\right)\right] + \Delta n_c\left[t_{3,0} + y\left(1 + \frac{1}{2.2}\right)\right]$ or (9)

$\phi = \Delta n[t_{1,0} - t_{0,0}] + \Delta n_c t_{3,0} + y\left(1 + \frac{1}{2.2}\right)(\Delta n_c - \Delta n)$ From Equations 7 and 9 and from Equations 1 and 2

(10)

$\phi = y\left(1 + \frac{1}{2.2}\right)0.00163 + 0.00194 \times 0.2741 - 0.00031 \times 0.5$ In particular, the phase difference $\phi$ is linear in the displacement $y$ of the element 110.

The displacement $y_f$ wherein the optical path of the complementary zone exceeds that of the conjugate zone by one-half wave length, namely, $$\phi_f = -\frac{\lambda}{2}$$

will now be computed.
From Equation 10

$y_f = \frac{1}{\left(1 + \frac{1}{2.2}\right)1.63}\left\{-\frac{0.589}{2} + 0.31 \times 0.5 - 1.94 \times 0.2741\right\}$ Therefore

(11) $\quad y_f = -0.2831$ mm.

Thus, when component 110 is moved upward from the above-described initial position by 0.2831 mm., the phase difference is shifted from $\phi_0 = +\frac{\lambda}{2}$ to $\phi_f = -\frac{\lambda}{2}$ To summarize, with the chosen indices the optical path of the conjugate zone exceeds that of the complementary zone by one-half wave length when component 110 is at an initial position with $t_{1,0} = 0.2$ mm.

$t_{0,0} = 0.4741$ mm.

$t_{3,0} = 0.5$ mm.

The optical path of the complementary zone exceeds that of the conjugate zone when component 110 is moved to a final position at which $t_{1,f} = 0.3287$ mm.

$t_{0,f} = 0.1910$ mm.

$t_{3,f} = 0.0882$ mm.

As $t_0$ is varied from $t_{0,0} = 0.4741$ mm. to $t_0 = t_{0,f} = 0.1910$ mm., the optical path difference is varied continuously from $+\frac{\lambda}{2}$ to $-\frac{\lambda}{2}$ or throughout one wave length. If we measure the motion of component 110 from the initial or $+\frac{\lambda}{2}$ position and designate its displacement as $y$, the path difference will be varied from $+\frac{\lambda}{2}$ to $-\frac{\lambda}{2}$ as $y$ is varied from zero by 0.2831 mm. in an upward direction.

Inasmuch as component 108 and adjusting ring 118 would be moved but $\frac{0.2831}{2.2}$ mm.

to achieve the foregoing variations of phase relation between spectra transmitted by the conjugate and complementary zones it would be preferable, where relative surface areas of components 108 and 110 are generally as set forth, to slightly modify the construction of the device as follows: Pins 112 would be attached to portion 122' of component 110 and project through carrying tube 104, and adjusting ring 118 would be repositioned to actuate the same. Component 108 would then be biased upwardly by repositioned springs 126. It may thus be said that for operational efficiency the component which is manually actuated should preferably be the one which undergoes the greater range of travel to achieve a given range of alteration of relative optical path between the two zones, this consideration also pertaining to use of the device for varying relative amplitude of the spectra, as above described.

In a further modification, of device 96, components including the lower surface of plate component 72' and those positioned below the same may be employed for modifiying both phase and amplitude simultaneously by providing a suitable fluid in chamber 100. Such a fluid could appropriately be in the form of a suitable mixture of the above-described crown oil, having colloidal carbon particles dispersed therein, and the aforementioned Shillaber oil, the functional properties of each having been set forth.

Other modifications advantageously permit the combination of the devices shown in Figs. 12 and 13 with components illustrated in Figs. 1 through 11. For example, the phase modifying device of Fig. 12, or any of the phase modifying portions of Fig. 13 constituting such a device and above described, could be introduced into the optical systems of Figs. 1 and 4. Said devices would be placed contiguous zonal polarizer 24 (or 24') adjacent the back focal plane of the objective, it being understood that said back focal plane may alternatively lie between objective lens components or to one side thereof according to the lens systems employed. In such a modification the compensator 31 (or 31') would be omitted. In operation, the fluid type of phase modifier of Figs. 12 and 13 would serve to gradually modify the phase relation of the deviated and undeviated spectra and the zonal polarizer and analyzer would enable a gradual modification of the amplitude ratio between said spectra as hereinbefore described.

As applied to the system of Fig. 7, the compensator 31 and zonal polarizer 24 could be omitted and the phase modifying devices of either Figs. 12 or 13 could be positioned at the location of zonal polarizer 24. A half-wave retardation plate with its optic axis in the plane thereof corresponding in contour to the zone which is conjugate the diaphragm aperture could be incorporated with the phase modifying device adjacent the back focal plane of the objective, the direction of polarization of polarizer 58 being fixed at 45° relative to the optic axis of the half-wave plate. The polarizer 58 would serve to plane polarize light entering the system, light passing through the complementary zone of the phase modifying device being polarized in the direction of said polarizer 58. The half-wave plate functions as a rotatory polarizer, polarizing light passing through the conjugate zone in a direction at 90° to that transmitted by the complementary zone. The rotatable analyzer operates to gradually vary the amplitude ratio between the deviated and undeviated spectra transmitted by the respective zones.

Another modification contemplates combining a fluid amplitude modifying device, such as the portion of Fig. 13 adapted to the purpose, with polarizing and birefringent components shown in Figs. 1 through 11. The fluid device could be positioned contiguous zonal polarizer 24 of Fig. 1 and analyzer 36 could be fixedly mounted. Accordingly, the fluid modifier could be employed for gradually altering the amplitude ratio between the deviated and undeviated spectra and the compensator 31 could be tilted for obtaining a gradual change of phase relation between said spectra.

A diaphragm having an aperture of defined contour has been shown and described herein for admitting light to the various optical systems. While such a diaphragm constitutes a preferred embodiment and serves as a suitable secondary light source, the invention is not limited thereto and any means providing an area of light of suitable dimensions and contour, such as a primary or secondary light source of predetermined area and contour will suffice for the purpose. Thus, an incandescent filament, a fluorescent tube, a reflecting means, or the like may be positioned adjacent the front focal plane of the condenser; or the image of a lamp filament, the image of a diaphragm aperture or the image of some other radiant source may be so positioned for providing the introduction of suitable radiant energy to any of the optical systems comprehended by the invention.

It will be appreciated that various other modifications of the constructions and relative positioning of components may readily be made and are encompassed by the present invention. Such examples as are described herein while illustrating the invention, are not given by way of limitation as our invention may be otherwise embodied and practiced within the scope of the following claims.

We claim:

1. In an optical system for viewing an object of a type producing relative phase and amplitude differences between deviated and undeviated light rays emanating therefrom, the combination with a condenser and an objective of means providing a light source of predetermined dimensions and contour positioned adjacent the front focal plane of said condenser, a composite light-modifying assembly positioned adjacent the back focal plane of said objective and condenser combined and including a plurality of differentially formed light-transmitting portions, one of said portions being substantially geometrically similar to the contour of said light source and of such size and so located in said optical system as to intercept substantially all of the undeviated light rays transmitted by said objective, another of said portions intercepting the greater part of the deviated light rays transmitted by said objective, said assembly comprising an expansible fluid-tight chamber formed in part by said differentially formed portions of said assembly, a predetermined quantity of a fluid contained in said chamber, said fluid being adapted to change in refractive index when subjected to changes in temperature, whereby the optical path ratio between said differentially formed portions may be varied to provide a differential modification of said deviated and undeviated light rays when transmitted thereby, and means for providing gradual temperature changes within said chamber whereby said modification of light rays may be achieved progressively to obtain gradual alteration of contrast in an image of said specimen.

2. In a microscope for viewing a specimen of a type producing relative phase and amplitude differences between deviated and undeviated light rays emanating therefrom, the combination with a condenser and an objective of a diaphragm having a light source aperture of predetermined dimensions and contour formed therein for admitting light to said condenser, a composite light-modifying assembly positioned adjacent the back focal plane of said objective and condenser combined and including a plurality of differentially formed light-transmitting portions, one of said portions being substantially geometrically similar to the contour of said light source and of such size and so located in said optical system as to intercept substantially all of the undeviated light rays transmitted by said objective, another of said portions intercepting the greater part of the deviated light rays transmitted by said objective, said assembly comprising an expansible fluid-tight chamber formed in part by said differentially formed portions of said assembly, a predetermined quantity of a fluid contained in said chamber, said fluid being adapted to change in refractive index when subjected to changes in temperature whereby the optical path ratio between said differentially formed portions may be varied to provide a relative phase modification of said deviated and undeviated light rays when transmitted thereby, and variable electrical resistance means for providing gradual temperature changes within said chamber whereby said modification of light rays may be achieved progressively to obtain gradual alteration of contrast in an image of said specimen.

3. A composite light-modifying optical assembly for use in a variable phase contrast optical system, said assembly comprising a plurality of differentially formed light-transmitting portions for substantially individually intercepting deviated and undeviated light rays emanating from an object under observation in said system, said portions being formed so as to provide differences of optical path for said light rays when the latter are transmitted thereby, means cooperating with said portions to provide an expansible fluid-tight chamber positioned therebetween, a fluid contained in said chamber and adapted to change in refractive index when subjected to changes in temperature, whereby the optical path ratio between said differentially formed portions may be varied to provide a relative phase modification of said deviated and undeviated light rays when transmitted thereby, and means for providing gradual temperature changes of the liquid within said chamber whereby said modification of light rays may be achieved progressively to obtain gradual alteration of contrast in an image of said object.

4. In an optical system for viewing an object of a type producing relative phase and amplitude differences between deviated and undeviated light rays emanating therefrom, the combination with a condenser and an objective of means providing a light source of predetermined dimensions and contour positioned adjacent the front focal plane of said condenser, a composite light-modifying assembly positioned adjacent the back focal plane of said objective and condenser combined and including a plurality of differentially formed light-transmitting portions, one of said portions being substantially geometrically similar in shape to the contour of said light source and of such size and so located in said optical system as to intercept substantially all of the undeviated light rays transmitted by said objective, another of said portions intercepting the greater part of the deviated light rays transmitted by said objective, said assembly having one of said portions mounted for axial movement relative to another of said portions, means cooperating with said portions to provide a fluid-tight chamber positioned therebetween, a partially light-absorbing fluid contained in said chamber, and readily operable means for gradually moving at least one of said portions for differentially altering the thicknesses of said fluid aligned with said plurality of portions to provide a differential light absorption and, accordingly, a relative amplitude modification of said deviated and undeviated light rays to enable gradual alteration of contrast effects in an image of said object.

5. A progressively variable phase contrast optical system for examining highly transparent objects of very low contrast and of the type providing diffracted light rays and undeviated light rays when illuminated, said optical system comprising condenser and objective means in optical alignment along a common optical axis and so positioned relative to each other as to constitute a combined lens system having an entrance pupil and an exit pupil, means providing a light source of predetermined dimensions and contour intersecting said optical axis and positioned substantially at the entrance pupil of said combined lens system, for illuminating said highly transparent objects when positioned substantially at a predetermined object plane of and aligned with said objective, said objective receiving said diffracted light rays from said object and imaging same substantially at a predetermined conjugate image plane of said objective, said objective receiving said undeviated light rays and forming an image of said light source means substantially at said exit pupil, and composite light-modifying means comprising light-transmitting means and transparent light-altering means, said light-transmitting means being disposed between said object plane and said conjugate image plane and having at least two optically different light-transmitting portions disposed substantially at the exit pupil of said combined lens system, a first one of said light-transmitting portions having predetermined phase and amplitude modifying properties and being substantially geometrically similar in shape to the contour of said light source means and of such size and so located in said optical system as to intercept substantially all of the undeviated light rays being transmitted by said objective and forming said light source image, a second one of said light-transmitting portions havng predetermined phase and amplitude modifying light-transmitting properties which differ from those of said first light-transmitting portion, and being so positioned as to intercept a major part of the diffracted light rays being transmitted by said objective, said transparent light-altering means being positioned in said optical system and having phase and amplitude characteristics functioning co-operatively with said first and second light-transmitting portions to provide a controlled phase and amplitude relationship between said diffracted and undeviated light rays, said transparent light-altering means and said first and second portions being relatively progressively adjustable to progressively alter at least one of the phase and amplitude differences existing between said diffracted and undeviated light rays passing beyond said light-transmitting portions and toward said conjugate image plane, whereby said relative adjustment will provide a change in contrast effect in an image of said highly transparent objects at said conjugate image plane by optical interference altered in a gradual and uninterrupted manner.

6. A progressively variable phase contrast optical system for examining highly transparent objects of very low contrast and of the type providing diffracted light rays and undeviated light rays when illuminated, said optical system comprising condenser and objective means in optical alignment along a common optical axis and so positioned relative to each other as to constitute a combined lens system having an entrance pupil and an exit pupil, means providing a light source of predetermined dimensions and contour intersecting said optical axis and positioned substantially at the entrance pupil of said combined lens system, for illuminating a highly transparent object of the type described when positioned substantially at a predetermined object plane of and aligned with said objective, said objective receiving said diffracted light rays from said object and imaging same substantially at a predetermined conjugate image plane of said objective, said objective receiving said undeviated light rays and forming an image of said light source means substantially at said exit pupil, and composite light-modifying means comprising light-transmitting means and transparent light-altering means, said light-transmitting means being disposed between said object plane and said conjugate image plane and having at least two optically different light-transmitting portions disposed substantially at the exit pupil of said combined lens system, a first one of said light-transmitting portions having predetermined phase and amplitude modifying properties and being substantially geometrically similar in shape to the contour of said light source means and of such size and located in said optical system as to intercept substantially all of the undeviated light rays being transmitted by said objective and forming said light source image, a second one of said light-transmitting portions having predetermined phase and amplitude modifying light-transmitting properties which differ from those of said first light-transmitting portion, and being so positioned as to intercept a major part of the diffracted light rays being transmitted by said objective, said transparent light-altering means comprising a plurality of transparent light-altering elements longitudinally spaced along said optical axis and having phase characteristics functioning co-operatively with said first and second light-transmitting portions to provide a controlled phase and amplitude relationship between said diffracted and undeviated light rays, said light transmitting means and at least one of said elements being relatively progressively adjustable for progressively altering the phase difference existing between said diffracted and undeviated light rays passing beyond said light-transmitting portions and toward said conjugate image plane, whereby said relative adjustment will provide a change in contrast effect in an image of said highly transparent objects at said conjugate image plane by optical interference altered in a gradual and uninterrupted manner.

7. A progressively variable phase contrast optical system for examining highly transparent objects of very low contrast and of the type providing diffracted light rays and undeviated light rays when illuminated, said optical system comprising condenser and objective means in optical alignment along a common optical axis and so positioned relative to each other as to constitute a combined lens system having an entrance pupil and an exit pupil, means providing a light source of predetermined dimensions and contour intersecting said optical axis and positioned substantially at the entrance pupil of said combined lens system, for illuminating said highly transparent objects when positioned substantially at a predetermined object plane of and aligned with said objective, said objective receiving said diffracted light rays from said object and imaging same substantially at a predetermined conjugate image plane of said objective, said objective receiving said undeviated light rays and forming an image of said light source means substantially at said exit pupil, and composite light-modifying means comprising a light-transmitting component and a transparent light-altering component, said light-transmitting component being disposed between said object plane and said conjugate image plane and having two optically different light-transmitting portions disposed substantially at the exit pupil of said combined lens system, a first one of said light-transmitting portions having predetermined phase and amplitude modifying properties and being substantially geometrically similar in shape to the contour of said light source means, and of such size and so located in said optical system as to intercept substantially all of the undeviated light rays being transmitted by said objective and forming said light source image, a second one of said light-transmitting portions having predetermined phase and amplitude modifying light-transmitting properties which differ from those of said first light-transmitting portion, and being so positioned as to intercept a major part of the diffracted light rays being transmitted by said objective, said transparent light-altering component being positioned in said optical system so as to transmit said diffracted and undeviated light rays received thereby toward said conjugate image plane and having phase characteristics functioning co-operatively with said first and second portions, one of said components comprising light-polarizing means and the other of said components comprising fluid means, one of said components being readily adjustable to alter the phase difference existing between said diffracted and said undeviated light rays and the other of said components being readily adjustable to alter the amplitude difference therebetween, whereby the contrast effects in an image of said highly transparent object at said conjugate image plane may be by optical interference altered in a gradual and uninterrupted progressively variable manner.

8. A progressively variable phase contrast optical system for examining highly transparent objects of very low contrast and of the type providing diffracted light rays and undeviated light rays when illuminated, said optical system comprising condenser and objective means in optical alignment along a common optical axis and so positioned relative to each other as to constitute a combined lens system having an entrance pupil and an exit pupil, means providing a light source of predetermined dimensions and contour intersecting said optical axis and positioned substantially at the entrance pupil of said combined lens system, for illuminating said highly transparent objects when positioned substantially at a predetermined object plane of and aligned with said objective, said objective receiving said diffracted light rays from said object and imaging same substantially at a predetermined conjugate image plane of said objective, said objective receiving said undeviated light rays and forming an image of said light source means substantially at said exit pupil, and composite light-modifying means comprising a light-transmitting component and a transparent light-altering component, said light-transmitting component being disposed between said object plane and said conjugate image plane and having two optically different light-transmitting portions disposed substantially at the exit pupil of said combined lens system, a first one of said light-transmitting portions having predetermined phase and amplitude modifying properties and being substantially geometrically similar in shape to the contour of said light source means, and of such size and so located in said optical system as to intercept substantially all of the undeviated light rays being transmitted by said objective and forming said light source image, a second one of said light-transmitting portions having predetermined phase and amplitude modifying light-transmitting properties which differ from those of said first light-transmitting portion, and being so positioned as to intercept a major part of the diffracted light rays being transmitted by said objective, said transparent light-altering component being positioned in said optical system so as to transmit said diffracted and undeviated light rays received thereby toward said conjugate image plane and having phase characteristics functioning co-operatively with said first and second portions, one of said components comprising light-polarizing means and the other of said components comprising fluid means, one of said components being readily adjustable relative to the other to alter the amplitude difference existing between said diffracted and undeviated light rays, and means for altering the temperature of said fluid for changing the phase differences existing between the diffracted and undeviated light rays, whereby the contrast effect in an image of said highly transparent object at said conjugate image plane may be by optical interference altered in a gradual and uninterrupted progressively variable manner.

9. A progressively variable phase contrast optical system for examining highly transparent objects of very low contrast and of the type providing diffracted light rays and undeviated light rays when illuminated, said optical system comprising condenser and objective means in optical alignment along a common optical axis and so positioned relative to each other as to constitute a combined lens system having an entrance pupil and an exit pupil, means providing a light source of predetermined dimensions and contour intersecting said optical axis and positioned substantially at the entrance pupil of said combined lens system, for illuminating said highly transparent objects when positioned substantially at a predetermined object plane of and aligned with said objective, said objective receiving said diffracted light rays from said object and imaging same substantially at a predetermined conjugate image plane of said objective, said objective receiving said undeviated light rays and forming an image of said light source means substantially at said exit pupil, and composite light-modifying means comprising light-transmitting means and transparent light-altering means, said light-transmitting means being disposed between said object plane and said conjugate image plane and having at least two optically different light-transmitting portions disposed substantially at the exit pupil of said combined lens system, a first one of said light-transmitting portions having predetermined phase and amplitude modifying properties and being substantially geometrically similar in shape to the contour of said light source means and of such size and so located in said optical system as to intercept substantially all of the undeviated light rays being transmitted by said objective and forming said light source image, a second one of said light-transmitting portions having predetermined phase and amplitude modifying light-transmitting properties which differ from those of said first light-transmitting portion being so positioned as to intercept a major part of the diffracted light rays being transmitted by said objective, said transparent light-altering means being substantially clear and so positioned in said optical system as to provide phase characteristics functioning co-operatively with said first and second transparent light-altering portions for altering the optical path differences existing between said diffracted and undeviated light rays passing beyond said light transmitting portions and toward said conjugate image plane, one of said light-transmitting portions and said transparent light-altering means being readily relatively adjustable in a progressive manner so as to effect a gradual and uninterrupted alteration of the phase differences existing between the diffracted and undeviated light rays reaching said conjugate image plane, whereby the contrast effect in an image of said highly transparent objects at said conjugate image plane may be by optical interference altered.

10. A progressively variable phase contrast optical system for examining highly transparent objects of very low contrast and of the type providing diffracted light rays and undeviated light rays when illuminated, said optical system comprising condenser and objective means in optical alignment along a common optical axis and so positioned relative to each other as to constitute a combined lens system having an entrance pupil and an exit pupil, means providing a light source of predetermined dimensions and contour intersecting said optical axis and positioned substantially at the entrance pupil of said combined lens system, for illuminating said highly transparent objects when positioned substantially at a predetermined object plane of and aligned with said objective, said objective receiving said diffracted light rays from said object and imaging same substantially at a predetermined conjugate image plane of said objective, said objective receiving said undeviated light rays and forming an image of said light source means substantially at said exit pupil, and composite light-modifying means comprising light-transmitting means and transparent light-altering means, said light-transmitting means being disposed between said object plane and said conjugate image plane and having at least two optically different light-transmitting portions disposed substantially at the exit pupil of said combined lens system, a first one of said light-transmitting portions having predetermined phase and amplitude modifying properties and being substantially geometrically similar in shape to the contour of said light source means and of such size and so located in said optical system as to intercept substantially all of the undeviated light rays being transmitted by said objective and forming said light source image, a second one of said light-transmitting portions having predetermined phase and amplitude modifying light-transmitting properties which differ from those of said first light-transmitting portion being so positioned as to intercept a major part of the diffracted light rays being transmitted by said objective, said transparent light-altering means having substantially neutral light absorbing amplitude altering characteristics and being so positioned in said optical system as to function co-operatively with said first and second light-transmitting portions for altering the amplitude differences existing between said diffracted and undeviated light rays passing beyond said light-transmitting portions and toward said conjugate image plane, one of said light-transmitting portions and said transparent light-altering means being readily relatively adjustable in a progressive manner so as to effect a gradual and uninterrupted alteration of the amplitude differences existing between said diffracted and undeviated light rays reaching said conjugate image plane, whereby the contrast effect in an image of said highly transparent objects at said conjugate image plane may be by optical interference altered.

11. A progressively variable phase contrast optical system for examining highly transparent objects of very low contrast and of the type providing diffracted light rays and undeviated light rays when illuminated, said optical system comprising condenser and objective means in optical alignment along a common optical axis and so positioned relative to each other as to constitute a combined lens system having a front focal plane and a rear focal plane conjugate thereto, means providing a light source of predetermined dimensions and contour intersecting said optical axis and positioned substantially at said front focal plane, for illuminating said highly transparent objects when positioned substantially at a predetermined object plane of and aligned with said objective, said objective receiving said diffracted light rays from said object and imaging same substantially at a predetermined conjugate image plane of said objective, said objective receiving said undeviated light rays and forming an image of said light source means substantially at said exit pupil, and composite light-modifying means comprising light-transmitting means and transparent light-altering means, said light-transmitting means being disposed between said object plane and said conjugate image plane and having at least two optically different light-transmitting portions disposed substantially at said rear focal plane, a first one of said light-transmitting portions having predetermined phase and amplitude modifying properties and being substantially geometrically similar in shape to the contour of said light source means and of such size and so located in said optical system as to intercept substantially all of the undeviated light rays being transmitted by said objective and forming said light source image, a second of said light-transmitting portions having predetermined phase and amplitude modifying light-transmitting properties which differ from those of said first light-transmitting portion and being so positioned as to intercept a major part of the diffracted light rays being transmitted by said objective, said transparent light-altering means so being positioned in said optical system and having phase and amplitude characteristics functioning co-operatively with said first and second light-transmitting portions for altering at least one of the phase and amplitude differences existing between said diffracted and undeviated light rays passing beyond said light transmitting portions and toward said conjugate image plane, said transparent light-altering means having adjustable means operatively connected therebetween for controlling the temperature thereof to thereby alter the refractive index of said light-altering means in a progressive manner, whereby the contrast effect in an image of said highly transparent objects at said conjugate image plane may be by optical interference altered in a gradual and uninterrupted manner.

12. In a phase contrast microscope for viewing objects of very low contrast and of a type producing deviated and undeviated light rays, the combination with a condenser and objective forming a combined lens system, a diaphragm having a light source aperture of predetermined dimensions and contour formed therein for admitting light to said condenser, said diaphragm being disposed adjacent the front focal plane of said combined lens system, a composite light-modifying assembly positioned substantially at the back focal plane of said combined lens system, said light-modifying assembly comprising a plurality of light-transmitting members, one of said members having predetermined phase and amplitude modifying properties and being substantially geometrically similar in shape to the contour of said light source aperture and of such a size and so located relative to said combined lens system as to intercept substantially all of the undeviated light rays transmitted by said objective and forming an image of said aperture at said back focal plane, another of said members having different predetermined phase and amplitude modifying properties and intercepting the greater part of the deviated light rays transmitted by said objective, one of said members being mounted for movement relative to another of said members, means co-operating with said members to provide a chamber positioned therebetween, a fluid having a predetermined index of refraction which differs by a predetermined amount from the index of refraction of said members contained in said chamber, readily adjustable means adapted to change the refractive index of said fluid to thereby modify a wave characteristic of said light rays contributing to one of said phase and amplitude differences existing between said deviated and undeviated light rays, and readily operable means for gradually moving said movable component for altering the relative thicknesses of portions of said fluid which are aligned with said light-transmitting members to gradually alter the modification of the other of said phase and amplitude differences and, accordingly, to gradually vary by optical interference the contrast effects in an image of said objects.

13. A composite light-modifying optical assembly for use in producing a phase contrast optical system, said assembly comprising a plurality of longitudinally spaced plate-like members providing a pair of light-transmitting zonal portions disposed in laterally arranged relation to each other and having different thicknesses for respectively intercepting the greater part of the deviated and undeviated light rays emanating from an object when under observation in said optical system, one of said members being axially movable with respect to another of said members for causing a difference in optical paths for said deviated and undeviated light rays passing through and beyond said zonal portions, enclosing means co-operating with said plate-like members to provide a fluid-receiving chamber positioned therebetween, a substantially clear light-transmitting fluid contained in said chamber and having a refractive index which is predeterminately different with respect to the refractive index of said plate-like members so as to provide through said zonal portions optical paths which vary differently with changes in thickness of said chamber, and without appreciable absorption of the light rays passing therethrough, and means for gradually moving said movable member for affecting changes in relative thicknesses of said fluid aligned with said zonal portions so as to provide a relative modification of the phase difference existing between said deviated and undeviated light rays, whereby a gradual uninterrupted alteration of contrast effect by optical interference in an image of said object may be provided.

14. A composite light-modifying optical assembly for use in producing a phase contrast optical system, said assembly comprising a plurality of longitudinally spaced plate-like members providing a pair of light-transmitting zonal portions disposed in laterally arranged relation to each other and having different thicknesses for respectively intercepting the greater part of the deviated and undeviated light rays emanating from an object when under observation in said optical system, a pair of said members being axially movable with respect to one another for causing a difference in optical paths for said deviated and undeviated light rays passing through and beyond said zonal portions, enclosing means co-operating with said plate-like members to provide a fluid-receiving chamber positioned therebetween, a substantially clear light-transmitting fluid contained in said chamber and having a refractive index which is predeterminately different with respect to the refractive index of said plate-like members so as to provide through said zonal portions optical paths which vary differently with changes in thickness of said chamber, and without appreciable absorption of the light rays passing therethrough, and means for gradually moving one of said movable members for affecting changes in relative thicknesses of said fluid aligned with said zonal portions so as to provide a relative modification of the phase difference existing between said deviated and undeviated light rays, whereby a gradual uninterrupted alteration of contrast effect by optical interference in an image of said object may be provided.

15. A composite light-modifying optical assembly for use in producing a phase contrast optical system, said assembly comprising pairs of longitudinally spaced plate-like members providing a pair of light-transmitting zonal portions disposed in laterally arranged relation to each other for respectively intercepting the greater part of the deviated and undeviated light rays emanating from an object when under observation in said optical system, a first pair of said members having one member thereof axially movable with respect to the other and having different thicknesses in different parts thereof for causing a difference in optical paths for said deviated and undeviated light rays passing through and beyond said zonal portions, enclosing means co-operating with said first pair of plate-like members to provide a first fluid-receiving chamber positioned therebetween, a substantially clear light-transmitting fluid contained in said first chamber and having a refractive index which is predeterminately different with respect to the refractive index of said first pair of plate-like members, so as to provide through said zonal portions optical paths which vary differently with changes in thickness of said first chamber, and without appreciable absorption of the light rays passing therethrough, a second pair of said members having one member thereof axially movable relative to the other and having different thicknesses in different parts thereof for causing a change in amplitude between said deviated and undeviated light rays passing therethrough, enclosing means co-operating with said second pair of members to provide a second fluid-receiving chamber, a fluid in said second chamber having light absorbing properties and means for gradually moving said movable members of said first and said second pair of members for affecting changes in relative thicknesses of said fluids aligned with said zonal portions so as to provide a relative modification of the phase and amplitude differences existing between said deviated and undeviated light rays, whereby a gradual uninterrupted alteration of contrast effect by optical interference in an image of said object may be provided.

16. The combination as defined in claim 5 and in which the progressively adjustable means for effecting said uninterrupted progressively variable contrast is readily tiltable relative to the optical axis of said system for altering one of the phase and amplitude differences of the light rays being transmitted thereby.

17. The combination as defined in claim 5 and in which the adjustable means for effecting said uninterrupted progressively variable contrast is readily operative in a manner to alter the effective thickness thereof in the direction of the optical axis of the system for altering one of the phase and amplitude differences of the light rays being transmitted thereby.

18. The combination as defined in claim 5 and in which the progressively adjustable means for effecting said uninterrupted progressively variable contrast is readily rotatable about an axis substantially parallel to said optical axis for altering one of the phases and amplitude differences of the light rays being transmitted thereby.

References Cited in the file of this patent

UNITED STATES PATENTS

| | | |
|---|---|---|
| 60,109 | Woodward | Nov. 27, 1866 |
| 2,074,106 | Foster | Mar. 16, 1937 |
| 2,105,671 | Roesch | Jan. 18, 1938 |
| 2,186,619 | Sauer | Jan. 9, 1940 |
| 2,300,251 | Flint | Oct. 27, 1942 |
| 2,427,689 | Osterberg | Sept. 23, 1947 |
| 2,481,660 | Harrison | Sept. 13, 1949 |
| 2,516,905 | Osterberg et al. | Aug. 1, 1950 |

FOREIGN PATENTS

| | | |
|---|---|---|
| 636,168 | Germany | Oct. 7, 1936 |
| 839,173 | France | Dec. 26, 1938 |

OTHER REFERENCES

Leiss: "Optischen Instrument," pages 174–179, published by W. Engelmann, Leipzig, 1899.